United States Patent
Lund et al.

[11] Patent Number: 6,149,743
[45] Date of Patent: Nov. 21, 2000

[54] METHOD OF COMPLETE BAINITE HARDENING

[75] Inventors: Thore Lund; Staffan Larsson; Patrik Ölund, all of Hofors, Sweden

[73] Assignee: Ovako Steel AB, Hofors, Sweden

[21] Appl. No.: 09/119,579

[22] Filed: Jul. 21, 1998

[30] Foreign Application Priority Data

Aug. 1, 1997 [SE] Sweden .................................. 9702852

[51] Int. Cl.$^7$ ..................................................... C21D 6/00
[52] U.S. Cl. ............................................ 148/579; 148/906
[58] Field of Search .................................. 148/579, 660, 148/664, 587, 906

[56] References Cited

U.S. PATENT DOCUMENTS 5,840,136  11/1998  Maruki et al. .......................... 148/664

FOREIGN PATENT DOCUMENTS

| 402277715 | 11/1990 | Japan . |
| 05112817 | 5/1993 | Japan . |
| 07179936 | 7/1995 | Japan . |
| 2019436 | 3/1979 | United Kingdom . |
| 83/10959 | 6/1983 | WIPO . |

*Primary Examiner*—Deborah Yee
*Attorney, Agent, or Firm*—Burns, Doane, Swecker & Mathis, L.L.P.

[57] ABSTRACT

A method of complete bainite hardening of steel for use in bearings and other load carrying components, wherein bainite transformation is performed at a temperature just above the martensite formation temperature, transforming 25%–99% of the austenite into bainite at said temperature, and then increasing the temperature to speed up the transformation of the remaining austenite into bainite.

5 Claims, 1 Drawing Sheet

METHOD OF COMPLETE BAINITE HARDENING

BACKGROUND OF THE INVENTION

The present invention relates to a method for complete bainite hardening of steel for use in bearings and other load carrying components. The invention is useful in processing such steels as known to those in the relevant technical area.

Bainite hardening is sometimes preferred in steels instead of martensite hardening. This is because a bainitic structure in general has better mechanical properties, e.g., higher toughness, higher crack propagation resistance, etc. Therefore, for critical components such as bearings or other load carrying components especially subjected to fatigue, a bainitic structure could be most suitable.

Bainite hardening is widely used to produce components with high strength and hardness. For a given steel, the bainite structure often exhibits superior mechanical properties and structural stability compared to a martensite structure. The disadvantage with bainite hardening, however, is the long process time. To reduce the processing time for isothermal bainite transformation, it is necessary to increase the bainite transformation temperature. However, this will reduce the hardness which could affect the properties of the component.

GB, A, 2019436 discloses a method of producing a steel alloy which is tough, strong and economical. The method involves a bainite hardening treatment in the region of 0° C. and 100° C. above the martensite point, until a maximum transformation of 85%, preferably 80%, of the martensite to bainite. The steel is then cooled to room temperature. The method is more economical as there is a great savings in the time compared to a traditional complete transformation. However, the part of the steel which is not transformed into bainite does affect the properties of steel.

OBJECTS AND SUMMARY OF THE INVENTION

It is an object of this invention to avoid or alleviate the problems of the prior art.

It is further an object of this invention to provide a method for complete bainite hardening which reduces the bainite transformation time without reducing the hardness. With the new process compared to traditional isothermal bainite transformation, it is possible to shorten the process time for a given hardness, or for a given transformation time, increase the hardness.

It is an aspect of the invention to provide a method of complete bainite hardening of steel for use in bearings and other load carrying components, comprising heat-treating a steel at a temperature just above the martensite formation temperature, transforming 25%–99% of the austenite into bainite at said temperature, and then increasing the temperature to speed up the transformation of the remaining austenite into bainite.

BRIEF DESCRIPTION OF THE DRAWINGS

The invention will be described more in detail below with reference to the accompanying drawings, wherein.

Figure 1:
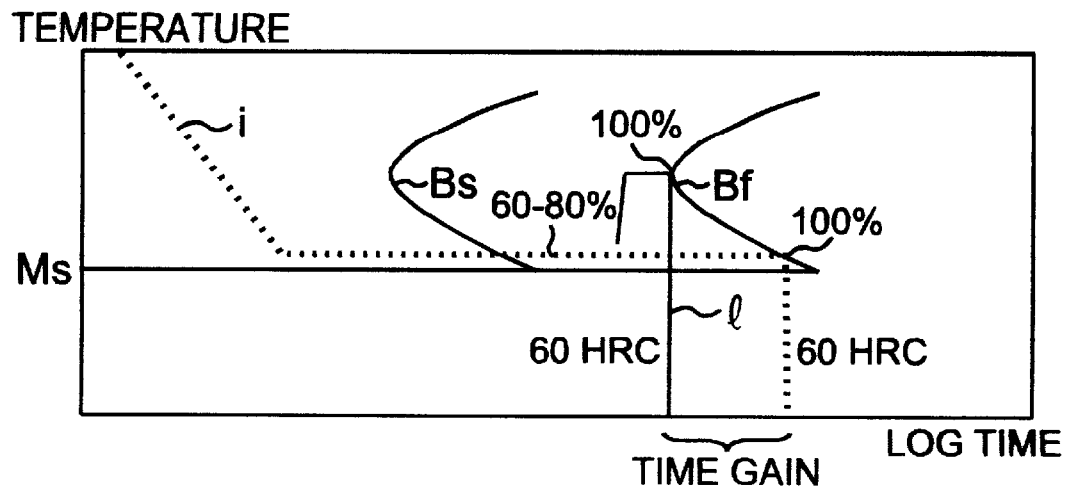
FIG. 1 is a schematic drawing of two heat-treating cycles which give approximately the same hardness but with one having a significantly shorter transformation time.
Figure 2:
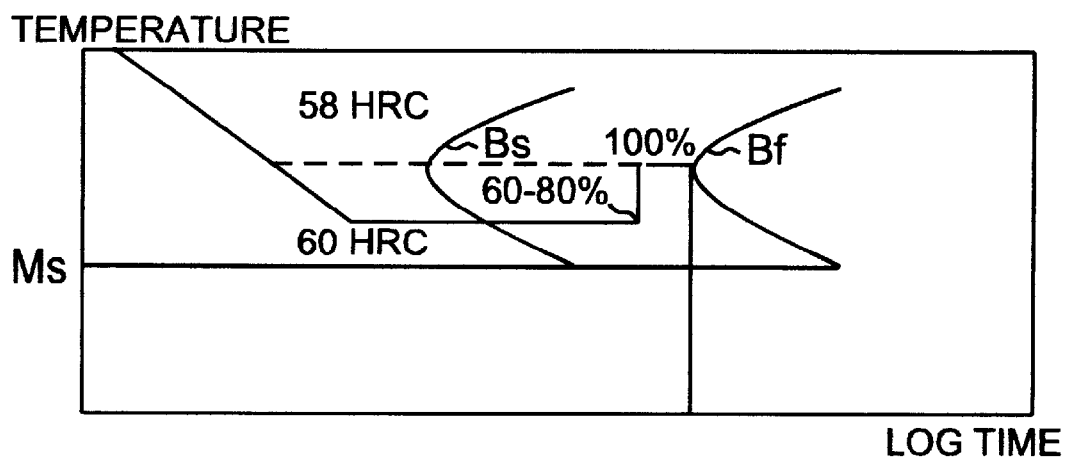
FIG. 2 is a schematic drawing of two heat-treating cycles with the same transformation time but with one having significantly higher hardness.

In both FIGS. 1 and 2, the percentages shown refer to % transformation of austenite into bainite.

DETAILED DESCRIPTION OF THE PREFERRED EMBODIMENTS OF THE INVENTION

In FIG. 1, the temperature versus log time is plotted for two cycles giving approximately the same hardness, i.e., 60 HRC. Ms denotes the martensite start point, which normally varies between about 180° C. and 280° C., depending on the composition of the steel alloy. Bs denotes the start of bainite transformation and Bf denotes the finish of bainite transformation. In order to obtain maximum hardness, the temperature should be close to the martensite start point. This, however, results in a very long transformation time which is not economical, which is illustrated with the dotted line i in FIG. 1.

According to the presently claimed invention, illustrated with the solid line 1 in FIG. 1, the bainite transformation is performed slightly above the Ms point until more than 25% up to 99%, preferably 50%–90%, most preferably 60%–80%, transformation has occurred, and the remaining hardening is performed at an increased temperature at which the transformation proceeds with increased velocity to 100%. The temperature can be increased any amount so as to result in a complete bainite transformation. The amount of temperature increase and time to complete transformation can be determined by one of ordinary skill using known techniques. The fraction of bainite formed at the higher temperature has not shown any noticeable effects on the hardness.

Another way to use the process according to the presently claimed invention, is to increase the hardness for a given transformation time, which is illustrated in FIG. 2. In the process illustrated with a dashed line, the transformation takes place at the optimum temperature in view of the velocity of transformation, versus time consumption for 100% transformation to bainite. This optimum temperature can be determined by the skilled artisan using conventional techniques. The resulting material has a hardness of 58 HRC.

According to the presently claimed invention, the bainite hardening is performed along the solid line at a lower temperature to more than 50%, preferably 60%–80%, bainite transformation, and then the temperature is increased to the optimum temperature. This results in a steel alloy with a hardness of 60 HRC, using the same transformation time.

In practice, both features could be achieved compared to traditional bainite hardening, i.e., shorter transformation time and higher hardness. The results also show increased structural stability which is very important in many applications.

The invention is additionally illustrated in connection with the following Example which is to be considered as illustrative of the present invention. It should be understood, however, that the invention is not limited to the specific details of the Example.

EXAMPLE

The tests were carried out in a dilatometer. The composition of the steel was according to Table 1.

TABLE 1

| Chemical Composition in Weight % | | | | |
|---|---|---|---|---|
| C | Si | Mn | Cr | Mo |
| 0.96 | 0.09 | 0.84 | 1.91 | 0.56 |

The example in Table 2 shows that for a transformation time of 9h+1h (No#1) with the new bainite cycle, it is possible to obtain a hardness of approximately 60 HRC. For the same hardness to be reached by a conventional bainite hardening, the transformation time will be approximately 33h (No#2). A transformation time of 10 hours with a conventional bainite cycle requires that one increase the temperature and consequently the hardness will drop to approximately 59 HRC (No#3).

TABLE 2

| No # | Heat Treatment Experiments | | | | | | |
|---|---|---|---|---|---|---|---|
|  | Aust. T | Aust. t | Trans f T | Trans f t | Temp T | Temp t | Hardness |
| 1 | 885° C. | 3 h 20 min | 210° C. | 9 h | 250 | 1 h | 59.9 HRC |
| 2 | 885° C. | 3 h 20 min | 210° C. | 33 h | N/A | N/A | 60.1 HRC |
| 3 | 870° C. | 2 h | 230° C. | 10 h | N/A | N/A | 58.8 HRC |

N/A = not applied

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of complete bainite hardening of an austenized steel for use in bearings and other load carrying components, consisting essentially of heat-treating a steel at a temperature just above the martensite formation temperature, transforming 25%–99% of the austenite into bainite at said temperature, and then increasing the temperature to speed up the transformation of the remaining austenite into bainite.

2. The method of claim 1 wherein about 50%–90% of the austenite is transformed into bainite before the temperature is increased.

3. The method of claim 2 wherein about 60%–80% of the austenite is transformed into bainite before the temperature is increased.

4. The method of claim 1 wherein the transformation of the remaining austenite occurs by a higher transformation velocity relative to the rate at which said 25%–99% of the austenite was transformed.

5. The method of claim 1, wherein the temperature at which the 25%–99% of the austenite is transformed to bainite is substantially constant.

* * * * *